United States Patent [19]

Strauff

[11] 3,945,456

[45] Mar. 23, 1976

[54] SERVO STEERING SYSTEMS FOR MOTOR VEHICLES

[75] Inventor: Günther Strauff, Kaarst, Germany

[73] Assignee: Langen & Co., Dusseldorf, Germany

[22] Filed: Nov. 15, 1974

[21] Appl. No.: 524,377

[30] Foreign Application Priority Data
Nov. 22, 1973  Germany............................ 2358184

[52] U.S. Cl.............. 180/79.2 R; 91/380; 91/417 R
[51] Int. Cl.² .......................................... B62D 5/08
[58] Field of Search...... 180/79.2 R; 91/417 R, 380, 91/467, 466, 391

[56] References Cited
UNITED STATES PATENTS
3,010,335  11/1961  Foerster et al........................ 91/380

FOREIGN PATENTS OR APPLICATIONS
636,559   2/1962   Canada........................... 180/79.2 R
1,138,652  10/1962  Germany......................... 180/79.2 R
1,940,490  3/1972   Germany......................... 180/79.2 R Primary Examiner—M. H. Wood, Jr.
Assistant Examiner—John A. Pekar
Attorney, Agent, or Firm—Holman & Stern

[57] ABSTRACT

A servo steering system for motor vehicles has a stepped servo piston arranged in a cylinder-forming space of a housing for dividing the cylinder space into a pair of separated working spaces of different volumes. The servo piston is engaged by a worm shaft connected to a steering wheel of the vehicle and arranged extending into the housing. The working space having the larger volume is connected to a pressure source by a valve member operatively connected with a lever associated with the servo piston for controlling fluid flow through the working space and magnifying movement of the worm shaft, with the smaller volume working space of the servo piston being connected directly to the pressure source. Reaction spaces of a stepped control piston of the valve member are substantially in the same ratio as the working spaces of the servo piston.

14 Claims, 4 Drawing Figures

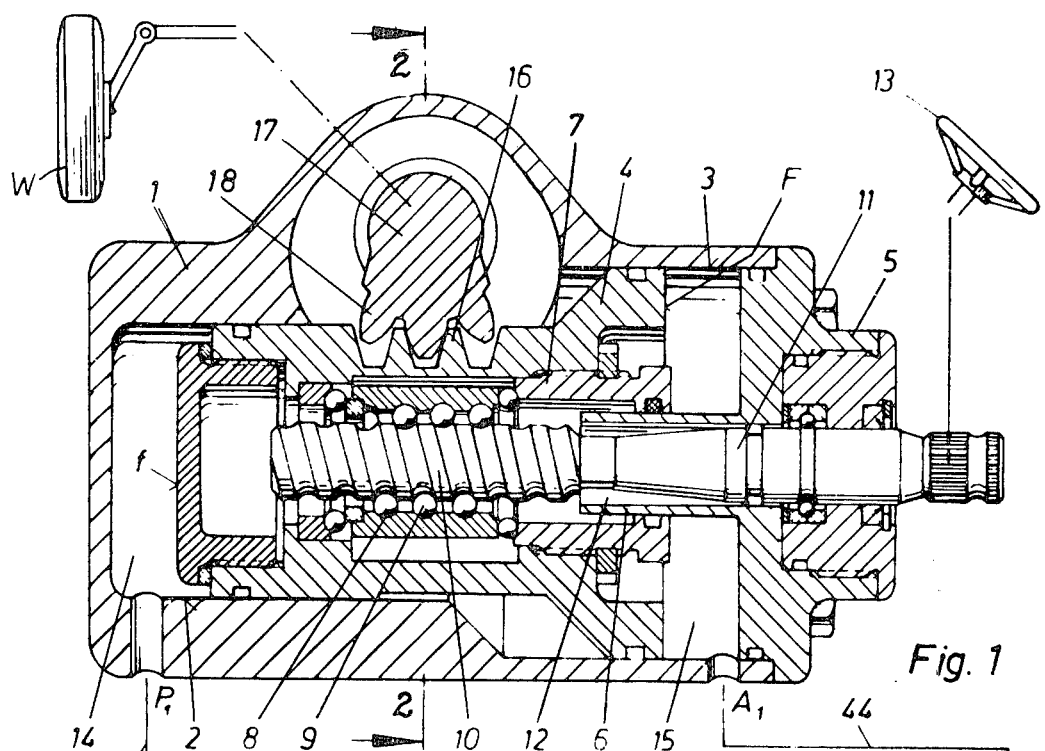
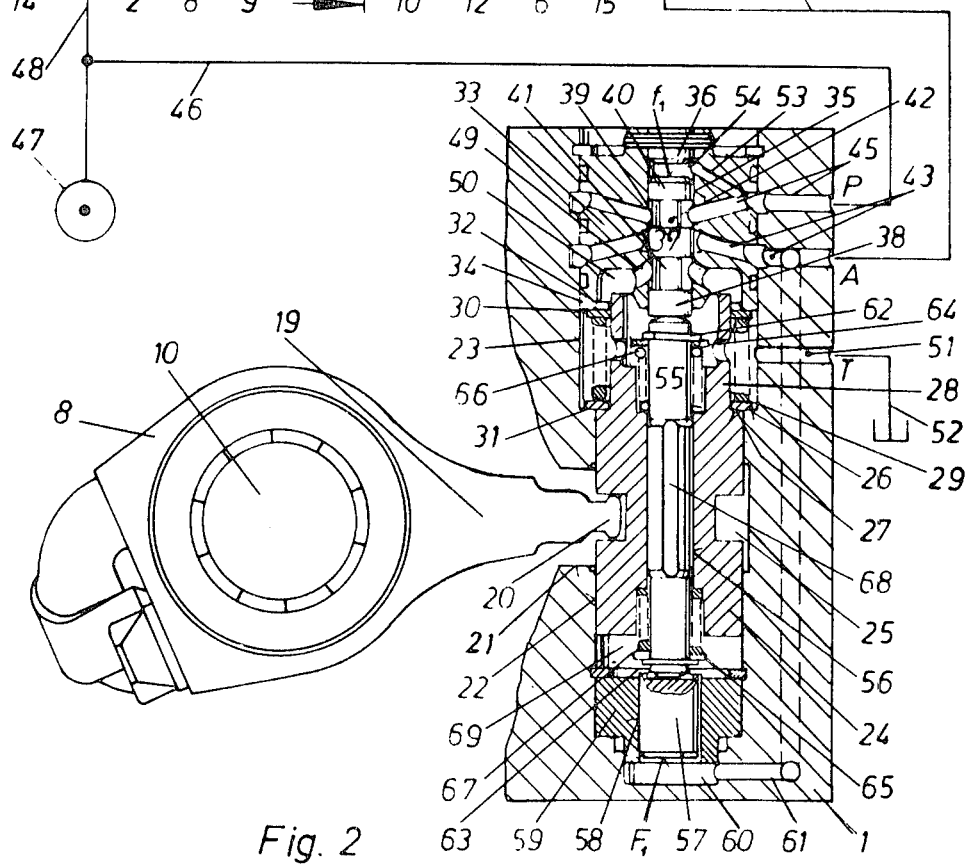
Fig. 1
Fig. 2

SERVO STEERING SYSTEMS FOR MOTOR VEHICLES

BACKGROUND OF THE INVENTION

The instant invention relates to a servo steering system for motor vehicles, and is of the kind comprising a steering worm shaft which is in operational connection with the steering wheel of the vehicle, closely penetrates a housing, and extends into a cylinder space provided within said housing. The steering worm shaft engages a steering gear nut which is generally axially displacable and drives a further gear member as, for example, by means of gear teeth. The steering gear nut functions simultaneously as a servo piston within the cylinder space, or, however, as seen in the axial direction, is fixedly connected with a servo piston. In this manner, the cylinder space is divided by the servo piston into two precisely separated working spaces, and the steering gear nut, either in a section which is formed as the servo piston of in an area remote from the sealing and guiding over of the servo piston, is provided with a lever on its outer surface. The lever moves in an axial direction and extends radially outwardly, and has an axial extent which corresponds at least with the lift of the servo piston. The lever engages a groove provided in the housing and arranged parallel to the axis of the nut. The length of the lever is measured in a manner so that the lever is able to perform minute tilting movements relative to the housing in cases where the steering gear nut, due to rotational momentum and increase of the steering worm grooves during a rotation of the steering worm shaft, is also caused to rotate. Thus, the tilting movements serve to operate at least one valve member being arranged in the housing vertical to the axial direction, in a manner so that the inflow of pressure to, or the outflow of the pressure from, a working space is controlled in such a way that the movement which is initiated by the steering worm shaft is supported in the axial direction, whereby the valve member, or the valve members, are provided with reaction areas which are stressed by the pressures in the working spaces or are in functional connection with respective reaction members so as to transmit a feeling of control or steering to the driver of the vehicle.

Prior art servo steering systems of this kind have been constructed with the working spaces which are divided in the cylinder space by means of the servo piston provided with essentially the identical effective areas. Accordingly, the valve member, or valve members, had the function of a 4/3-way valve; that is, when one operational space, or work chamber, was connected with a pressure-source, then the other operational space was in connection with an outlet, or vice versa. In a central position, either all conduits are blocked, or at least only partially connected to each other. The type of steering which thereby developed is also known as "four-edge steering" since the valve member, or the valve members, must be provided with four guiding edges.

In so far as the pressure supply is blocked during a center position of the four-edge steering, there may develop hydraulic knocks, sudden jerking movements in the steering system, and undesirable noise may develop during oversteering of a connection. In order to avoid such developments, it has already been proposed in other types of servo steering systems to utilize so-called "two-edge steering". "Two-edge steering" requires for functioning a differential motor — namely, a servo motor with two differently dimensioned, large operational areas — which are commonly of a 2:1 ratio. The smaller effective area is permanently stressed with pressure from the pressure source, while the larger effective area is connected interchangeably with the pressure source, or with an outflow, by means of a valve member which is provided with the function of a 3/3-way valve, such that, depending on its structure, in the center position of the valve member, this connection is blocked, or at least throttled.

In servo steering systems of the above-mentioned kind, it was formerly impossible, with small outer forces on the steered wheels of a vehicle, as it is known to be the case with icy road conditions, or fast highway driving, to steer without hydraulic servo support and with only a substantially pure mechanical power transmission.

SUMMARY OF THE INVENTION

It is therefore an object of the instant invention to construct a servo steering system of the above-mentioned type in such a manner that, below a borderline operating power, there can develop a purely mechanical power transmission between the steering wheel and the guided wheels of a vehicle. When the borderline operating power is being exceeded, the hydraulic servo support should gradually increase. Furthermore, the advantages of a two-edge steering are to be utilized.

The solution of this problem is accomplished according to the present invention in that the servo piston is constructed as a stepped piston having operational surfaces which are preferably in a relationship of 1:2, whereby a working space which is arranged relative to the smaller effective operational surface is permanently connected with the pressure source, while the other working space is either connected with the pressure source or an outflow by means of a valve member in the form of a 3-way control piston which is also constructed as a stepped piston. Further, the control piston is provided with two reaction areas, the ratio of which are identical to the ratio of the operational surfaces of the servo piston and which are stressed by the pressures of the corresponding working spaces, whereby the operation of the control piston via at least one regulator spring, or adjustment spring, is made by means of an auxiliary piston, which is centered opposite the housing by at least one prestressed spring, and whereby the auxiliary piston is operated by means of a lever which is connected to the steering gear nut. Advantageously, the auxiliary pistons and control pistons are arranged coaxially to each other. The spring which serves for the centering of the auxiliary piston should be doubly effective so that in both directions of movement there results precisely an identical movement-resistance. Especially, in such cases in which the lever is located within a pressurized working area, the auxiliary piston should seal off the groove bilaterally opposite the bore. In order to avoid meanufacturing technically difficult to control double-centering, the sequencing piston may be constructed in more than one section, whereby the free frontal areas serve as the reaction areas. Extreme advantageous mounting conditions result when the control piston is divided into a control section with frontal reaction areas and a reaction section with frontal reaction areas, whereby the reaction section penetrates axially the auxiliary piston and with its free end submerges into a housing bore or a bore within a mechanical sleeve which is fixedly connected with the housing, while the control section preferably slides in a fixed-housing control sleeve. Furthermore, it is also possible to construct the reaction section in two parts. The adjustment spring engages in a favorable manner the reaction section. A centering of the control pistion is obtained through utilization of two oppositely biasing prestressed adjustment springs which are effective at both sides of the auxiliary piston between the same and stops on the reaction section. A precise centering is obtained with the aid of an adjustable threaded sleeve, which is centrally screwed into the auxiliary piston, and is penetrated by the reactional section and serves for supporting the adjustment springs. The areas which contain the adjustment springs are connected with the outlet. In so far as two adjustment springs are utilized, the spring spaces are connected with each other, for example, by means of a channel within the reaction section.

BRIEF DESCRIPTION OF THE DRAWINGS

The inventive embodiments are explained in detail by the drawings, wherein:

FIG. 1 shows a section through a servo steering system along the axis of the steering worm shaft and perpendicular to the axis of the separating gear member;

FIG. 2 shows a section according the line 2—2 of FIG. 1, with some unimportant sections omitted, and wherein are shown the pressure medium channels and pipes in symbolical form which run within the servo steering device, and which connect the respective conduits in FIGS. 1 and 2;

DESCRIPTION OF THE PREFERRED EMBODIMENT

Figure 3:
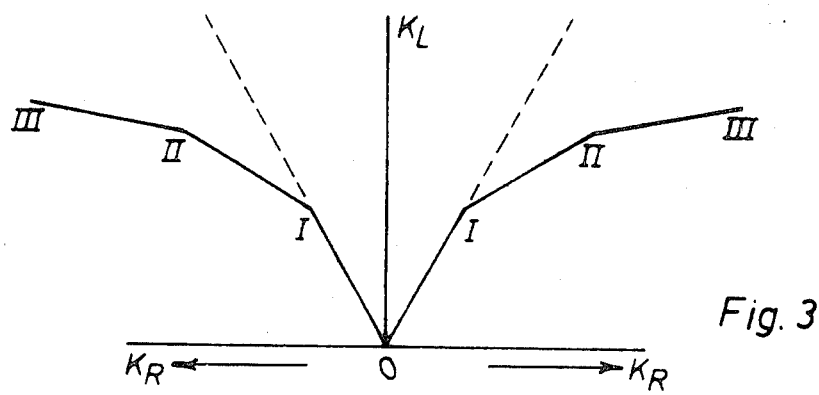
FIG. 3 shows diagrammatically the course of power at the steering wheel in dependence on the power of the steered wheels of a motor vehicle.

A housing 1 has arranged therein a piston space which comprises a cylinder space 2 provided with a predetermined diameter, and a coaxially adjacent cylinder space 3 of a larger diameter than the diameter of space 2. A servo piston 4, constructed to have respective steps, slides in the cylinder spaces 2 and 3. The cylinder space 3 is sealed frontally by means of a cover 5, which is provided with a centered cylindrical extension 6 which protrudes into said cylinder space 3. This cylindrical extension 6 sealingly penetrates a sleeve 7, which serves for axially fixing a steering nut 8 arranged inside servo piston 4. The control gear, or steering nut, 8 is engaged by a steering worm shaft 10 by means of spherical ball elements 9. Shaft 10 is provided with an unthreaded portion 11 which sealingly extends outwardly through a central bore 12 provided in the extension 6 of cover 5, and which is in functional connection in a known manner with a steering spindle (not shown) and a steering wheel 13. The servo piston 4 delimits in the cylinder space 2 a frontal working space 14, as well as a working space 15 which surrounds in circular fashion the extension 6. The effective volumes of the working spaces 14 and 15 are advantageously in the relationship 1:2, respectively. The servo piston 4, outside the area thereof which serves for sealing between spaces 14 and 15, is provided with a part serving as a gear rack 16, and which engages a toothed segment 18 itself connected to a driving shaft 17.

The steering gear nut 8 is connected to a lever 19, which lever points substantially away from the axial direction of the steering gear nut 8. As the invention is shown in FIG. 2, it has not been deemed necessary to illustrate all parts seen in the sections 2—2 of FIG. 1. For reasons of simplicity, only the steering nut 8 and the lever 19 are shown, as well as a valve system which will be described in more detail. The lever 19 penetrates the servo piston 4 by means of a recess, which is not shown in detail. The axial recess of the lever 19 is at least as long as the stroke of the servo piston 4. With its free end 20, the lever 19 extends into a slot 21 which runs axially within the housing 1. The width of the slot 21 is very little larger than the width of the lever 19, so that the lever 19, as seen in the direction of the circumference of the steering nut, is limited in its movement. A bore 22 communicates with the slot 21 crosswise to the axial direction of the steering nut 8. The bore 22 widens at a certain distance from the slot 21 into a coaxial bore 23. In the bore 22 slides an auxiliary piston 24, which is provided with an annular groove 25 of a smaller width than that of slot 21. In annular groove 25 engages a free end 20 of lever 19. At both sides of the slot 21, the auxiliary piston 24 is guided tightly in the bore 22. Based on a center position, the auxiliary piston 24 is reduced in the area of a step-forming reduction 26 between the bores 22 and 23 so that there results a step-forming reduction 27 as well as a cylindrical projection 28. The projection 28 serves for guiding a spring means 29, which is supported on two spring plates 30 and 31. The spring plate 30 bears on, in a center position of the auxiliary piston 24, a stop member 32 on the projection 28. Simultaneously, the spring plate 30 touches, in the above-mentioned center position, the frontal area of a projection 34 which develops due to a central countersinking in a sleeve 33 which is tightly mounted in the bore 23. The spring plate 31, however, affects in the center position thereof the reductions 26 and 27 to the same degree. Sleeve 33 is provided with a central bore 35, which is outwardly tightly sealed by means of a threaded plug 36. In the bore 35 slides a control member 37 of a multi-sectional control piston. The control member comprises three shoulders, 38, 39 and 40, which are separated from each other by means of reduced shank diameters 41 and 42. The shoulder 39 seals in a center position a channel 43, which by means of conduit A and a pipe 44 is connected with a conduit $A_1$ which terminates into the working space 15. A channel 45 opens into the bore 35 in the area of the separating reduced shank diameter 42. The bore 35 is connected with a pressure source 47 (not shown in detail) by means of conduit P and a pipe 46. A pipe 48 branches off from pipe 46, to a conduit $P_1$, which terminates in the working space 14. In the area of the reduced shank diameter 41, a channel 49 opens into the bore 35, which opens into the area 50, which area receives the spring 29 and the projection 28. The area 50 is connected to a conduit T by means of a channel 51, with an outflow pipe 52 being connected to the conduit T. A control channel 53 branches off from channel 45. Channel 53 terminates in a reaction space 54 adjacent the frontal area $f_1$ of shoulder 40. The free frontal area of the shoulder 38 affects the frontal area of a push rod 55, which forms a reaction section and is guided in a central bore 56 within the auxiliary piston 24 and which, with its opposite frontal area, affects a reaction piston 57 which tightly slides in a bore 58 within a sleeve 59 mounted in bore 22. The free frontal area of the reaction piston 57 serves as the reaction area, and is indicated with reference $F_1$. A space 60, which is arranged closely adjacent the reaction area $F_1$, is connected to channel 43 by means of a control channel 61. Close to the end thereof, the push rod 55 is provided with stop members 62 and 63, which serve as abutments for the spring plates 64 and 65. On the spring plates 64 and 65 are supported the springs 66 and 67, which, with their other ends, affect the auxiliary piston 24. A transverse groove 68 in the push rod 55 connects a space 69, which receives the spring element 67, with the space 50.

Figure 4:
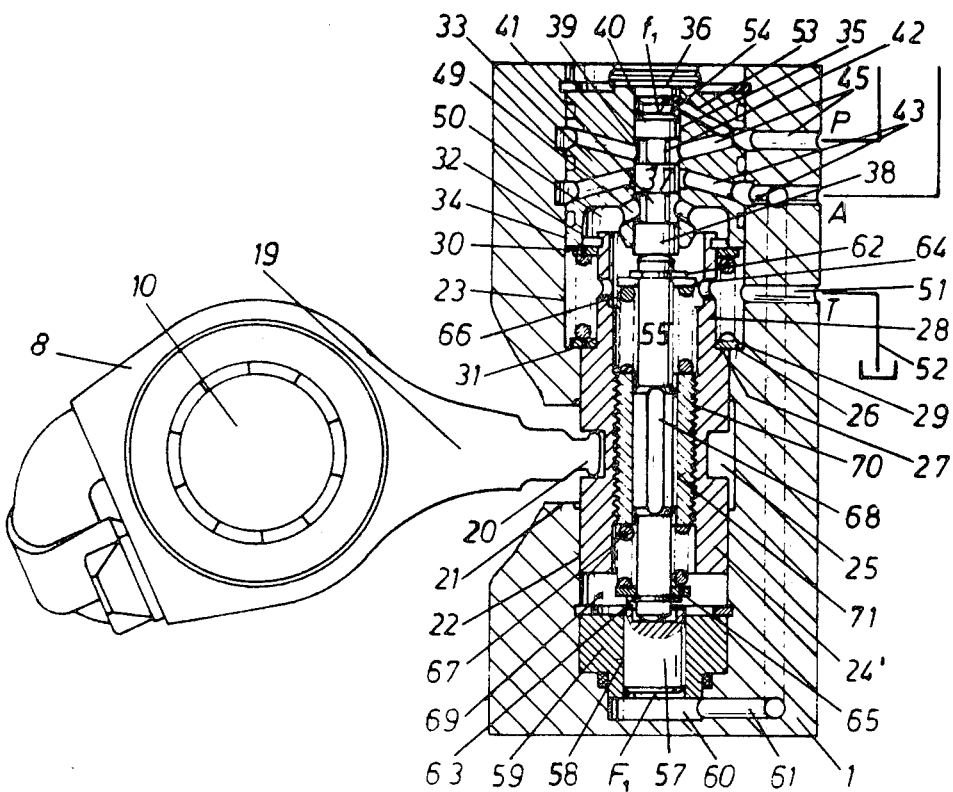
FIG. 4 illustrates a section similar to that of FIG. 2, but showing a different embodiment.

The embodiment of FIG. 4 varies from that shown in FIG. 2 solely by the fact that the springs 66 and 67 are not supporting themselves directly on the auxiliary piston 24, but on a threaded sleeve 70 which is screwed into an auxiliary piston 24'. The push rod 55 is accordingly guided in a central bore 71 of the threaded sleeve 70. All other parts remain the same and, accordingly, have identical reference numerals.

In order to explain the function of the present invention, it should be assumed that a motor vehicle provided with the inventive servo steering system is moving at a fast driving speed on a smooth surface. The necessary forces for initiating a steering movement to the steered wheels of a motor vehicle are in such a case very small. It may further be assumed that a steering movement on the steering wheel 13, or on the steering worm shaft 10, is initiated in clockwise fashion see FIG. 2. The lever 19, due to frictional forces developed through the cooperation of steering worm shaft 10, the spherical ball elements 9, and steering nut 8, because of the selected section on which the drawing is based, will then try to move in a counter-clockwise direction. Since the spent momentum, however, as above mentioned, is very low, the lever 19 will not be in a position to move the auxiliary piston 24 against the prestressing of the spring 29. The steering gear nut 8 is, therefore, forced to move in the axial direction of the steering worm shaft 10, and will transmit this movement via the servo piston 4 and the toothed rod, or rack, 16 to the toothed segment 18 and the driving shaft 17. The driving shaft 17 itself affects the steered wheels (only one of which is shown in FIG. 1) of the motor vehicle.

Rotation of steering worm shaft 10 in the clockwise direction corresponds with the movement of the servo piston 4 towards the right. During this movement, the working space 15 is reduced, so that the pressure medium, via the conduit $A_1$, the pipe 44 and the conduit A, is forced into the channel 43. The minor pressure increase which thereby developes is transmitted to control channel 61 into the space 60, and there affects the reaction areas $F_1$. The power increase which thereby develops is sufficient to overcome the substantially constant remaining force which affects the control section 37 from the reaction area 54, and which is caused by the pressure in the pressure source 47. The reaction piston 57, push rod 55, and control element 37 move, therefore, somewhat upwardly so that by means of the shoulder 39 a connection between the channels 43 and 49 is released. The pressure medium which is forced out of the working space 15 is, therefore, able to flow from conduit A via the channel 43, channel 49, the space 50, the channel 51, and the conduit T into the outflow pipe 52. It should here be noted that during this entire process, the prestressing of the spring 29 has not changed. The springs 66 and 67, which are provided with a smaller stress and which are generally at first in balance, have in contrast thereto changed their prestressing only to a small extent. The spring 66 has been released, while the spring 67 has been prestressed somewhat higher. The increasing working space 14 is filled with pressure from the pressure source 47 and retains in general a constant pressure. If, in the reverse, the steering wheel 13 and the steering worm shaft 10 are moved counter-clockwise, then the lever 19 supports itself on the auxiliary piston 24 below a predetermined borderline force, without causing prestressing of the spring 29 to be overcome. The steering nut 8 must, therefore, move towards the left, and this movement must be transmitted to either the servo piston 4 or to the driving shaft 17. During such a movement, the working space 15 is enlarged, so that there develops in it a minute pressure reduction. This pressure reduction communicates to the conduit $A_1$, the pipe 44, the conduit A, the channel 43, and the control channel 61, into the space 60 and effects there a small reduction of the forces which affect the reaction area $F_1$. The forces, that here also remain substantially constant on the reaction area $f_1$ of the control piston 37, effect a downward movement of control element 37, the push rod 55, and reaction piston 57. The spring 66 is, therefore, further stressed to a small extent, while the spring 67 is somewhat relieved. The shoulder 39 releases a connection between the channels 45 and 43, so that pressure is able to flow from the pressure source 47 via the pipe 46, the conduit P, the channel 45, the channel 43, the conduit A, the pipe 44, and the conduit $A_1$ into the working area 15, and thereby balances the developing pressure reduction.

It should be noted that during these procedures, no hydraulic support of the steering movement takes place. In this area, the entire force necessary for steering is manually provided. The connection may be seen from the diagram shown in FIG. 3, in which the forces $K_R$ on the wheels are entered in the abscissa, while the forces $K_L$ on the steering wheel are entered on the ordinate. One is able to recognize that the increase of the force $K_L$, due to the missing hydraulic support, runs relatively steep with respect to the curve line O—I. The broken curve shown by the broken line and extending beyond "I" shows the course of the force $K_L$ on the steering wheel for the case where a hydraulic support does not at all take place. Since the manually-required forces would, however, be very high, the prestressing of the spring 29 is selected so that during a period amounting to that exceeding of the forces corresponding with Point I, a hydraulic support beings, at first slowly and then increasingly.

For an explanation of the corresponding mode of operation of the invention, it may be assumed that the steering wheel 13 and the steering worm shaft 10 are moved clockwise. Based on the illustration, the lever 19, which moves in the same direction as the wheel 13, affects the auxiliary piston 24, and since, as assumed, the prestressing of the spring 29 should be overcome, the spring plate 31 lifts from the reductions 26 and 27. The increase in the prestressing of spring 29 is being felt as part of the total reaction force which affects lever 19. At this point, it should be noted that there does not take place a movement of servo piston 4, by means of the steering worm shaft 10 as long as the steering gear nut 8 rotates together with the steering worm shaft 10. By means of the movement of the auxiliary piston 24, relative to the housing 1, being at first moved only to a minor amount, spring 66 is stressed somewhat higher, while spring 67 tends to release stress. As a result, the upwardly directed force on the push rod 55 is increased and is in position to move the control member 37 also upwards to some extent. As a result thereof, there develops, for one thing, a second reaction force on lever 19, which reflects the changed prestressing of springs 66 and 67, and for the other, movement of control member 37 upwardly. Shoulder 39 is, therefore, in position to produce a connection between conduits A and T, whereby pressure is able to flow from the operational space 15, via the above already described connection, into the outflow pipe 52. The pressure reduction which thereby develops in the operational space 25 reduces the force which affects the operational area F, so that the constant force which affects the operational area $f$ is larger and moves servo piston 4 hydraulically to the right as seen in FIG. 1. Namely, precisely in the direction in which servo piston 4 would have had to move without servo support. Since the pressure in working space 15 becomes effective also in the reaction space 60 and stresses therein the reaction area $F_1$, and, on the other hand, the pressure in the operational space 14 is present in reaction space 54 and stresses therein the reaction areas $f_1$, the control piston which comprises the control member 37, the push rod 55, and the reaction piston 57, functions like the control piston of a pressure-regulating valve. Namely, the developing pressure differences between the working spaces 14 and 15 depend substantially on the change of the prestressing of the springs 66 and 67. Since, in addition to the manual force which corresponds with the sum of the reaction forces, a hydraulic servo force becomes now effective, and the power increase of power $K_L$ on the steering wheel corresponding to line I—II is more balanced than in purely manual steering system. When the power $K_R$ on the wheels, for example during the parking of a motor vehicle, is increasing, and exceeds the value of point II, then the spring 66 is compressed to such an extent that a mechanical contact develops between the auxiliary piston 24 and a spring plate 64. In consideration of the fact that the respective steering edge of shoulder 39 will open by some 0.1 mm, the control member 37 will have already assumed almost one and the same position. However, while before the auxiliary piston 24 was forced to continue to move under compression of the springs 29 and 65, it is now also possible for the auxiliary piston 24 to retain its position due to mechanical contact on spring plate 64. This means that the driver of the vehicle needs to now balance only the reaction forces on the steering wheel 13 resulting from the power difference which develops on the reaction areas $F_1$ and $f_1$. Since an increase of the mechanical power transmission component no longer occurs, the increase of the power $K_L$ is balanced to a greater extend than before, as may be seen from the curve line II—III.

In a reversed steering process — namely, a movement of the steering wheel 13 counter-clockwise — lever 19 in FIG. 2 will move clockwise and move thereby the control piston 24 downwardly, whereby the spring plate 30 releases itself from the projection 34. Simultaneously, the spring 67 is stressed, while spring 66 is relieved. The push rod 55, together with the reaction piston 57, and the control member 37, move downwardly a slight extent until the respective control edge on the shoulder 39 permits an overflowing of pressure from channel 45 into channel 43. Pressure flows, therefore, from pressure source 47 into the working space 15 and effects therein a pressure increase which causes servo piston 4 to move to the left as seen in FIG. 1. If the power $K_R$, which is required on the wheels w, increases further, then auxiliary piston 24 is also compensated for by a compression of the springs 29 and 66, so that here also again there develops a power-increase according to the curve line I—II to the left of the abscissa in FIG. 3. After a certain displacement of the auxiliary piston 24, there takes place a mechanical contact between the auxiliary piston 24 and the spring plate 65, corresponding to Point II. Since, as already mentioned, the position of the control member 37, the push rod 55, and the reaction piston 57 relative to the housing 1 remains practically unchanged, the auxiliary piston 24 will also now take an almost unchanged position. With a further increased power $K_R$, the driver of the vehicle has, therefore, only to overcome the hydraulic reaction force which increases on the reaction area $F_1$, so that there again results the relatively even curve II—III going to the left in FIG. 3. If it becomes possible to construct the diameter of the control member 37 and the diameter of the reaction piston 57 sufficiently thin, then it will be possible to construct the curve line II—III so flat that there develops the function of a limited steering power.

An automatic reversing of the steered wheels w into a straight position is easily possible since spring 29 functions as a centering assembly in combination with the springs 66 and 67. A resetting with a purely manual steering — namely, by noncompensated auxiliary piston 24' — is also possible since the pressure differences which develop due to the return movement tendency in working space 15 extend to the reaction area $F_1$ and move the control member 37 in such a manner so that there are always produced the correct connections for the outflow of pressure from the working space 15, or for the inflow of pressure into working space 15. A precise centering of the control member 37 is easily obtained, even adjusting for the common production tolerances, with the aid of the threaded sleeve 70, which assists in varying the center position of push rod 55 and, therewith, the center position of the control member 37; see FIG. 4.

The instant invention is not, of course, limited to the embodiments illustrated in the drawing. Especially, there are known in the prior art servo steering systems with different forms of the control member 37, which must fulfill completely the function of a 3-way valve control piston. It is further possible to replace the spring 66 and 67 with a single dual-effective spring, similar to spring 29, which would be effective in both directions of movement.

The mechanical contact between the auxiliary piston 24 or 24' and the control piston 37, 55, 57, may, of course, take place also at another point than on the spring plates 64 and 65. Respective variations are left entirely to the judment of the designer. Furthermore, the control piston may, naturally, also be constructed as one single piece. Finally, it is also common practice not to provide reaction areas on the control member itself, but to permit a further reaction piston to come into operational contact with the control member.

What is claimed is:

1. In a servo steering system for motor vehicles, comprising, in combination:

a. a housing provided with a cylinder space and a groove parallel to an axial direction of the cylinder space;

b. a steering worm shaft operationally connected to a steering wheel, said shaft penetrating the housing and extending into the cylinder space of the housing;
c. a servo piston axially displacably arranged in the cylinder space for dividing the cylinder space into two separated working spaces, the servo piston being engaged by the worm shaft;
d. a lever associated with the servo piston, the lever moveable in the axial direction of the servo piston and extending radially away from the axis of the servo piston, the lever having an axial displacement which at least corresponds with the displacement of the servo piston and engaging in the groove provided in housing;
e. a valve member arranged perpendicularly to the axial direction of the cylinder space and operatively connected to the lever, the lever provided with a recess arranged for permitting minute tilting movements radially relative to the housing when the steering worm shaft is caused to rotate and for, accordingly, operating the valve member and controlling the inflow of pressure to and the outflow of pressure to a return from a working space formed by the servo piston for magnifying in the axial direction of the cylinder space a movement started by the steering worm shaft; and
f. a control piston included in the valve member provided with reaction areas placed under stress for transmitting a feeling of steering to the steering wheel and a driver of the vehicle;

the improvement wherein:

g. the servo piston is constructed as a stepped piston having a pair of operational surface of different areas, the working space associated with smaller area operational surface being connected directly to a pressure source, and the larger operational surface associated working space being connected to the pressure source or return line by means of the valve member;
h. the valve member control piston is provided with a pair of reaction areas, the effective areas of which are substantially in the same ratio as the effective areas of the working spaces of the stepped piston; and
i. said valve member control piston including at least one auxiliary piston which is displacably, spring-centered opposite said groove in the housing for operation by the lever in relation to torque conditions applied by the steering worm shaft.

2. The servo steering system for motor vehicles according to claim 1, wherein the operational areas of the stepped piston are in the relationship of 1:2, and the valve member control piston is a 3-way stepped control piston, and further including a worm nut connected to the servo piston and threadingly engaging the worm shaft for engaging the servo piston with the worm shaft, and at least one prestressed spring provided in the valve member arranged for centering the auxiliary piston.

3. The servo steering system for motor vehicles according to claim 2, characterized in that the auxiliary piston and control piston are coaxially arranged relative to each other.

4. The servo steering system for motor vehicles according to claim 3, characterized in that the spring for centering the auxiliary piston engages the auxiliary piston so as to react on the piston in all directions of movement of the auxiliary piston.

5. The servo steering system for motor vehicles according to claim 4, characterized in that the auxiliary piston seals a recess in the valve member, the recess being annular at both sides opposite of a bore which receives the auxiliary piston.

6. The servo steering system for motor vehicles according to claim 5, characterized in that the stepped control piston is of a multiple-section construction, and two free-front areas, thus formed, comprise the reaction areas.

7. The servo steering system for motor vehicles according to claim 6, characterized in that the control piston is divided into a control member provided with a frontal reaction area and a reaction section provided with a frontal reaction area, the reaction section axially penetrating the auxiliary piston and with its free end enters into a housing bore within a sleeve which is fixedly connected to the housing, while the control section slides in a casing-fixed control sleeve.

8. The servo steering system for motor vehicles according to claim 7, characterized in that an adjustment spring engages the reaction section.

9. The servo steering system for motor vehicles according to claim 8, characterized in that two counter-switched, prestressed adjustment springs operate on both sides of the auxiliary piston between these and stop members provided on the reaction section.

10. The servo steering system for motor vehicles according to claim 9, characterized in that the adjustment springs are supported on a threaded sleeve which is centrally mounted in the auxiliary piston and the threaded sleeve is penetrated by the reaction section.

11. The servo steering system for motor vehicles according to claim 10, characterized in that the spaces which contain the adjustment springs are connected with the return line means.

12. The servo steering system for motor vehicles according to claim 11, characterized in that the spaces are connected with each other by means of a channel within a reaction section push rod.

13. The servo steering system for motor vehicles according to claim 1, characterized in that the auxiliary and control pistons include a predetermined spring sequencing means therebetween so that a direct mechanical contact developes between the auxiliary and control piston.

14. The servo steering system for motor vehicles according to claim 13, wherein a spring plate is connected to the control piston and functions to place the control piston in contact with the auxiliary piston.

* * * * *